June 17, 1969

P. FEUGEAS 3,450,976

POWER REGULATING DEVICES OF THERMAL-ENGINE DRIVEN GENERATORS

Filed Jan. 6, 1967

United States Patent Office 3,450,976
Patented June 17, 1969

3,450,976
POWER REGULATING DEVICES OF THERMAL-ENGINE DRIVEN GENERATORS
Paul Feugeas, Paris, France, assignor to Compagnie Electro-Mecanique, Societe Anonyme, Paris, France
Filed Jan. 6, 1967, Ser. No. 607,819
Claims priority, application France, Jan. 7, 1966, 45,163
Int. Cl. H02h 7/06; H02p 9/02
U.S. Cl. 322—30
4 Claims

ABSTRACT OF THE DISCLOSURE

Device for regulating the power output of an electric current-generator unit or plant driven from an internal combustion or thermal engine, which comprises a main D.C. or A.C. current-generator rotatably driven from said engine, a circuit for delivering rectified current to the excitation winding of said generator, said circuit comprising an auxiliary alternator feeding through the medium of a rotary induction regulator having its rotor coupled to the control governor of said thermal engine, a rectifier connected to the excitation-winding, characterised in that there is inserted in the circuit energizing the excitation winding of the generator, between the induction regulator and the rectifier, a transformer mechanically and electrically connected to said induction regulator.

---

This invention relates to a device for regulating the power output of an electric current-generator unit or plant driven from an internal combustion or thermal engine, which comprises an internal-combustion or thermal engine driving a main current-generator (this term designating in the following disclosure either a D.C. generator proper or an alternator). This generator, notably in the case of a self-powered vehicle, energizes the traction motor or motors proper.

This invention is concerned more particularly with improvements in or relating to the device for regulating the excitation of the current-generator in order properly to adapt the power output, during the energy exchange, with the assistance of an induction regulator inserted in the A.C. circuit of an auxiliary alternator feeding through a rectifying unit the excitation winding of said current-generator.

It is known that in devices of this character the induction regulator stator is fed with contant-voltage current by means of a regulator known per se but at a frequency variable as a function of the operation of the internal combustion engine coupled to the auxiliary alternator constituting the source of excitation current.

Under these conditions the induction regulator rotor will deliver to the rectifying unit a voltage varying as a function of its inherent position with respect to the stator.

However, this regulation device is attended by two particularly detrimental inconveniences in the case of its direct use on board a self-powered vehicle. On the one hand, from the point of view of reliability, the presence of flexible wires permitting the desired rotation of the rotor and connecting the latter to the fixed portions of the mounting is scarcely advisable due to the mechanical vibration to which they are subjected and to the corresponding stress produced in the conductors, which may even lead to the breaking thereof; on the other hand, from the strictly operational point of view a same rotor position does not always correspond to the same voltage ratio between the stator input and rotor output of the inductor regulator, for the effect of frequency on the stator magnetic field is not always compensated by the corresponding variation in the rotor self-induction.

It is the object of the present invention to improve a regulation device of this character while eliminating the above-disclosed inconveniences.

To this end the power output regulation device of a current-generator driven by an internal-combustion or thermal engine, which comprises a main D.C. or A.C. current-generator rotatably driven from said engine, a circuit for supplying rectified current to the excitation winding of said generator, which circuit comprises an auxiliary alternator feeding, through the medium of a rotary induction regulator having its rotor coupled to the regulator of the internal-combustion or thermal engine, a rectifier connected to said excitation winding, is characterised in that there is inserted, in the circuit feeding the excitation winding of the generator, between the induction regulator and the rectifier, a transformer mechanically and electrically connected to the induction regulator.

As the winding of the induction regulator rotor is connected in series with that of the primary of said transformer, these two windings can thus be rigidly connected to each other and the flexible wires of the hitherto commonly used mountings are replaced by the magnetic coupling betwen the two windings of some transformer.

By reason of this last-mentioned magnetic coupling and also of the rotary field of the multi-phase rotor of said induction regulator, the frequency effect is thus practically compensated by the corresponding variation in the self-inductance in the secondary circuit of the transformer.

In order to afford a clearer understanding of this invention and of the manner in which the same may be carried out in practice, a typical form of embodiment thereof will now be described by way of example with reference to the accompanying drawings, in which.

Figure 1:
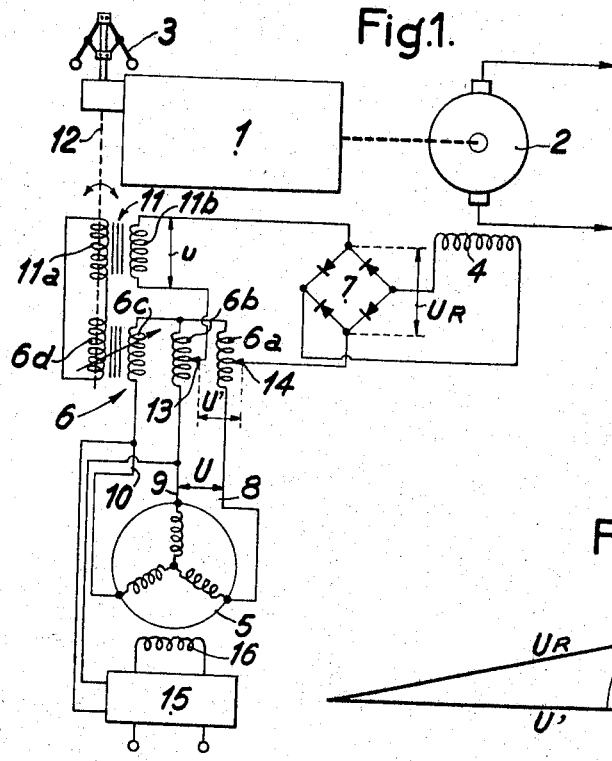
FIGURE 1 is a wiring diagram of a regulating device according to this invention.
Figure 3:
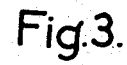
FIGURE 3 is a vectorial voltage diagram corresponding to the device shown in FIGURE 1.

The generator unit illustrated in FIGURE 1 comprises an internal combustion engine or thermal engine 1, for example a compression-ignition or diesel engine, driving a main D.C. current-generator 2 (or an alternator). The thermal engine 1 is controlled by means of a centrifugal governor 3 in a manner known per se. The main current-generator 2 comprises on the other hand an excitation winding 4 fed with rectified current from a unit comprising a three-phase auxiliary alternator 5, an induction regulator 6 and a rectifying bridge 7. Conductors 8, 9 and 10 connect said three-phase alternator 5 (delivering the excitation current) to the coils 6a, 6b and 6c constituting the three-phase stator winding of the induction regulator 6. This regulator further comprises a rotor winding 6d connected in series with the primary winding 11a of a single-phase transformer 11.

The thermal engine regulator 3 is adapted rotatably to drive through a shaft 12 shown in dash lines in FIGURE 1 the rotor winding 6d of the induction regulator and also the primary winding 11a of transformer 11.

This transformer 11 comprises on the other hand a fixed secondary winding 11b having one end connected to an A.C. terminal or the rectifying bridge 7 and its other end connected to a tapping 13 provided on one of the coils, namely coil 6b, of the stator winding of induction regulator 6. Another tapping 14 provided on another coil 6a of said stator winding is connected to the other A.C. terminal of said rectifying bridge 7.

Figure 2:
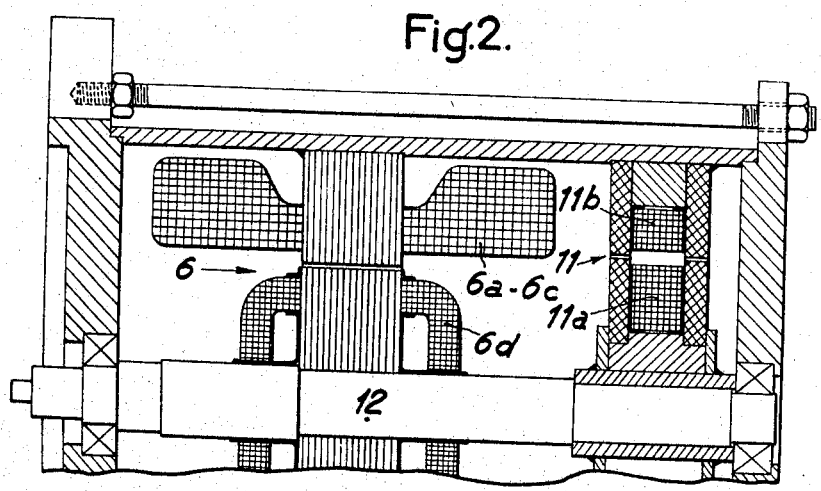
FIGURE 2 is a fragmentary axial section of the induction regulator.

FIGURE 2 illustrates a typical form of embodiment of the induction regulator, wherein the stator winding of the induction regulator is shown as consisting of the aforesaid coils 6a to 6c, of the rotor winding 6d of the regulator 6, and of the two primary and secondary windings 11a and 11b respectively of transformer 11. The rotor winding 6d of regulator 6 and the primary winding 11a of transformer 11 are mounted on a common shaft 12 rotatably driven from the centrifugal governor of thermal engine 1.

In FIGURE 1 it is clearly shown that one fraction U' of the voltage U produced across the phases of alternator 5 is taken between the tapping 13 and 14 of coils 6b and 6a of the stator winding of induction regulator 6. This voltage U' is fed to the circuit comprising in series the secondary winding 11b of transformer 11 and the rectifier 7 delivering rectified current to the excitation winding 4 of current-generator 2.

If $u$ is the voltage measured across the terminals of the secondary winding 11b, the voltage $U_R$ measured across the terminals of the load consisting of the rectifying bridge 7 and the excitation winding 4 is the resultant of the two voltages U' and $u$ fed in series.

The voltage U' tapped from the stator of the induction regulator 6 remains constant due to the provision of a regulating device 15 controlling the energization of the excitation winding 16 of alternator 5, this regulator 15 being of any known and suitable type.

The voltage across the terminals of the secondary winding 11b of the transformer 11 is inferred from that fed across the terminals of the primary winding 11a thereof, by simply knowing the transformation ratio selected for transformer 11, which ratio may if desired be 1:1.

The rotor winding 6d of induction regulator 6 is coupled to the centrifugal governor 3 of the thermal engine which drives said winding in the desired direction, in accordance with the orders received therefrom. Therefore, to each position of the coupling shaft 12 there corresponds a given position of the vector $u$ in the vectorial diagram of FIGURE 2.

The governor 3 driven from the thermal engine is thus adapted to continuously vary the A.C. fed across the terminals of rectifying bridge 7 and therefore the D.C. fed across the terminals of the excitation winding 4 determining the power output of the current-generator.

Under these conditions, for a given frequency or, in other words, for a same speed, and a same load of the thermal or internal combustion engine 1 of the power plant, or alternately for a same position of the governor driven from this engine, which corresponds to this speed, the voltage applied to the load is the same, that is, the excitation is unchanged.

On the other hand, when the frequency varies for a same position of the thermal engine governor 3, that is, when the load supported by the engine varies, it will be seen that the vector $u$ remains stationary for the frequency variation is compensated by the self-inductance variation in the secondary winding 11b.

The above-described regulation device is advantageous in that it delivers substantially the same excitation current to the main generator of the power plant for a same position of the induction regulator 6.

Although the present invention has been described in conjuction with a preferred embodiment, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A device for regulating the power output of a power plant including a governor-controlled thermal engine, and comprising a main current-generator of the D.C. or A.C. type, rotatably driven from said engine, an excitation winding associated with said generator, a circuit for supplying rectified current to said excitation winding, said circuit comprising an auxiliary alternator, a rectifier connected to said excitation winding and a rotary induction regulator connected across said auxiliary alternator and said rectifier, said regulator comprising a rotor coupled to said engine governor and a transformer mechanically and electrically connected to said induction regulator, said transformer being connected across said induction regulator and said rectifier.

2. A device as set forth in claim 1, wherein said induction regulator comprises a multi-phase stator winding and a single-phase rotor winding.

3. A device as set forth in claim 2, wherein said transformer is of the single-phase type and comprises a primary winding solid with the rotor of said induction regulator and connected in series with the rotor winding of said induction regulator, and a fixed secondary winding.

4. A device as set forth in claim 3, wherein said auxiliary alternator is of the multi-phase type and comprises means for feeding at least one fraction of the voltage tapped from two phases of said stator winding of said induction regulator, in series, to said fixed secondary winding of said transformer which is connected in series with said rectifier connected to the excitation winding of said generator.

References Cited

FOREIGN PATENTS 929,120 6/1963 Great Britain.

ORIS L. RADER, *Primary Examiner.*

H. HUBERFELD, *Assistant Examiner.*

U.S. Cl. X.R.

322—60, 76; 323—48, 52